Oct. 13, 1936.  R. NEUSCHOTZ  2,057,048
SIGNAL CONTROL SYSTEM
Filed July 25, 1929  3 Sheets-Sheet 1

Fig. 1.

INVENTOR
Robert Neuschotz
BY
Kenyon & Kenyon
ATTORNEY

Oct. 13, 1936.  R. NEUSCHOTZ  2,057,048
SIGNAL CONTROL SYSTEM
Filed July 25, 1929   3 Sheets-Sheet 2

Fig. 2.

INVENTOR
Robert Neuschotz
BY
Kenyon & Kenyon
ATTORNEY

Oct. 13, 1936.  R. NEUSCHOTZ  2,057,048
SIGNAL CONTROL SYSTEM
Filed July 25, 1929  3 Sheets-Sheet 3

Fig. 3.

INVENTOR
Robert Neuschotz
BY
Kenyon & Kenyon
ATTORNEY

Patented Oct. 13, 1936

2,057,048

UNITED STATES PATENT OFFICE 2,057,048

SIGNAL CONTROL SYSTEM

Robert Neuschotz, New York, N. Y.

Application July 25, 1929, Serial No. 380,827

40 Claims. (Cl. 177—336)

This invention relates to signal control systems for vehicles traveling between a plurality of stations and more particularly to signal control systems for elevators moving between a plurality of floors in a building.

In the operation of vehicles such as elevators under existing signaling systems, oftentimes more than one elevator receives the signals to stop at a floor and more than one stops at the floor after receiving the signals, with the result that the entire system is slowed up unnecessarily. This situation usually arises when one elevator is behind-time and loaded almost to capacity, due to having made a large number of stops. It has been impossible, however, to automatically cause this elevator to continue without receiving signals until more than a predetermined distance from another elevator moving in the same direction.

An object of the present invention is to provide means for indicating to the operator of a vehicle the proximity of another vehicle moving in the same direction and within a predetermined distance thereof.

Another object of the present invention is to provide means for automatically negating signals of a station between a plurality of which a number of vehicles are moving so far as one vehicle is concerned when another vehicle is within a predetermined distance thereof.

A further object of the invention is to provide means for automatically preventing the resetting of the station signals when the signals of one vehicle have been negated as before set forth.

Another object of the invention is to provide means for automatically preventing one car from receiving station signals when another car has already received said signals.

According to the present invention, signal control apparatus is provided which overcomes the difficulties hereinbefore set forth by providing apparatus for either visually indicating to an operator of a vehicle such as an elevator the close proximity of another of such vehicles so that he may disregard signals from stations or automatic means for preventing one of said vehicles from receiving station signals when another thereof is within a predetermined distance of the first vehicle. The control apparatus also provides means for preventing a second vehicle from receiving station signals when a preceding vehicle has already received and is answering the signals.

Ordinarily in such systems there is associated with each signalling station a signal zone of predetermined length, extending from the station to a point in advance thereof, and a reset zone, also of a predetermined length, extending from the station to a point beyond. When a vehicle enters this signal zone, assuming the station signal button has been pressed, it receives the signal within the car, to stop. Upon passing out of the zone beyond the station, the floor lantern is reset. In the present embodiment of the invention, we not only have such a signal zone and a reset zone associated with each station, but there is also a pre-reset zone extending from the station to a point in advance thereof, of predetermined length, which length is for our purposes greater than the length of the signal zone.

In addition, we have another predetermined distance to be measured between two vehicles moving in the same direction. As long as the vehicles in question are further apart than this predetermined distance, no interconnection between the two vehicles can arise to have one vehicle prevent another from receiving signals as it enters any active signal zone. In such case, therefore, each vehicle would proceed as in the old well-known manner, and the only active zones would be the signal zone and the reset zone, the pre-reset zone playing no part. The fundamental idea lying behind this invention is the provision of apparatus which, when two vehicles moving in the same direction are within the predetermined distance of each other, then one vehicle will influence the circuits of the other vehicle, so that they will be inoperative and at the same time not disturb the primary signaling circuits, so that the unaffected vehicle may answer such signals.

The various circuits of this embodiment are so interconnected that between any two vehicles moving in the same direction and within a predetermined distance, the following vehicle will prevent the leading one from receiving a station signal as it enters the active signal zone. Not only this, but certain operations take place which prevent this leading car from resetting the floor signal if it passes out beyond the station reset zone in advance of the controlling following vehicle. If, however, the leading vehicle enters an active signal zone before the following vehicle comes within the predetermined distance, and thereafter the following vehicle does come within such predetermined distance, the leading vehicle is unaffected by the following vehicle. In the latter case, however, as the following vehicle entered the signal zone of the same station, its signals would respond if prior thereto the following vehicle had not reset the entire signalling mechanism, so that the car lantern and floor lantern of the responding vehicle and station, respectively, went out.

If one vehicle has received a signal and subsequently another moves into proximity thereto, the second will also receive the signal and both will hold it as long as they are both in the narrow area between the upper edge of the pre-reset zone and a fixed distance above the signaling landing. The moment one or the other of the vehicles moves within this fixed distance contact is made and all signaling devices for that floor will go out. Ordinarily, a responding vehicle will be within this distance of the landing so that the pre-reset feature will function in advance of the next vehicle's entrance into the same signal zone.

By a simple rearrangement of the various contact points in the cut-out mechanism, we can, when two vehicles are within a predetermined distance of each other, both moving in the same direction, cause the following vehicle to prevent the leading one from receiving signals (such as shown in the present description) and vice versa.

This system may also be used in connection with automatic push button control cars, the cutting out of a car's signals being similar to preventing the operation of mechanisms designed to stop a car automatically when a button on a floor landing has been pressed.

Usually, with automatic elevators, when a button on a floor landing is pressed, a relay circuit is closed and energized, attracting an armature which opens the circuit of the driving motor so that the vehicle stops at the designated landing. The simple insertion of a similar armature in this relay circuit which is normally in a closed position when the station button is depressed, will, if opened at the proper time, prevent the relay circuit from being closed so that the circuit of the motor continues unbroken, and the vehicle does not stop. It is a relatively simple matter to control this inserted armature so that it is not in a closed position when one vehicle is within a predetermined distance of another moving in the same direction. In such case, the affected vehicle will continue without stopping.

Other objects and features of the invention will become readily apparent by reference to the following detailed description taken in connection with the accompanying drawings, wherein Figures 1 and 2 in conjunction represent diagrammatically the circuits and apparatus used in connection with an automatic selective signal control system.

Figure 1:
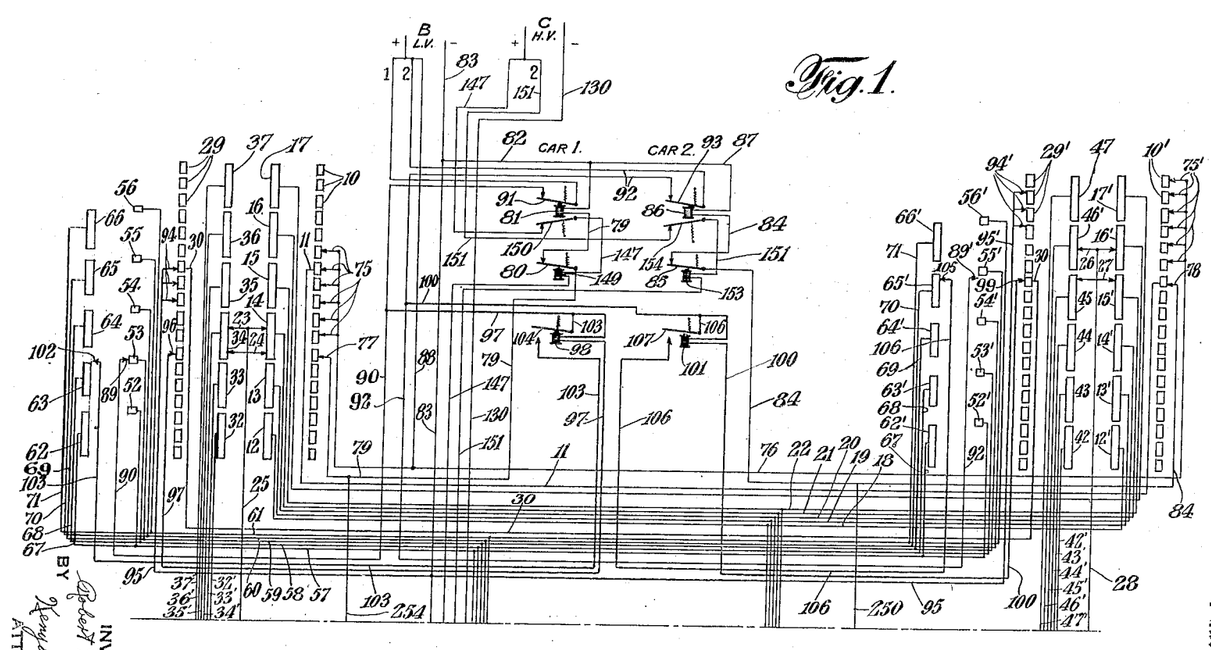
Figure 2:
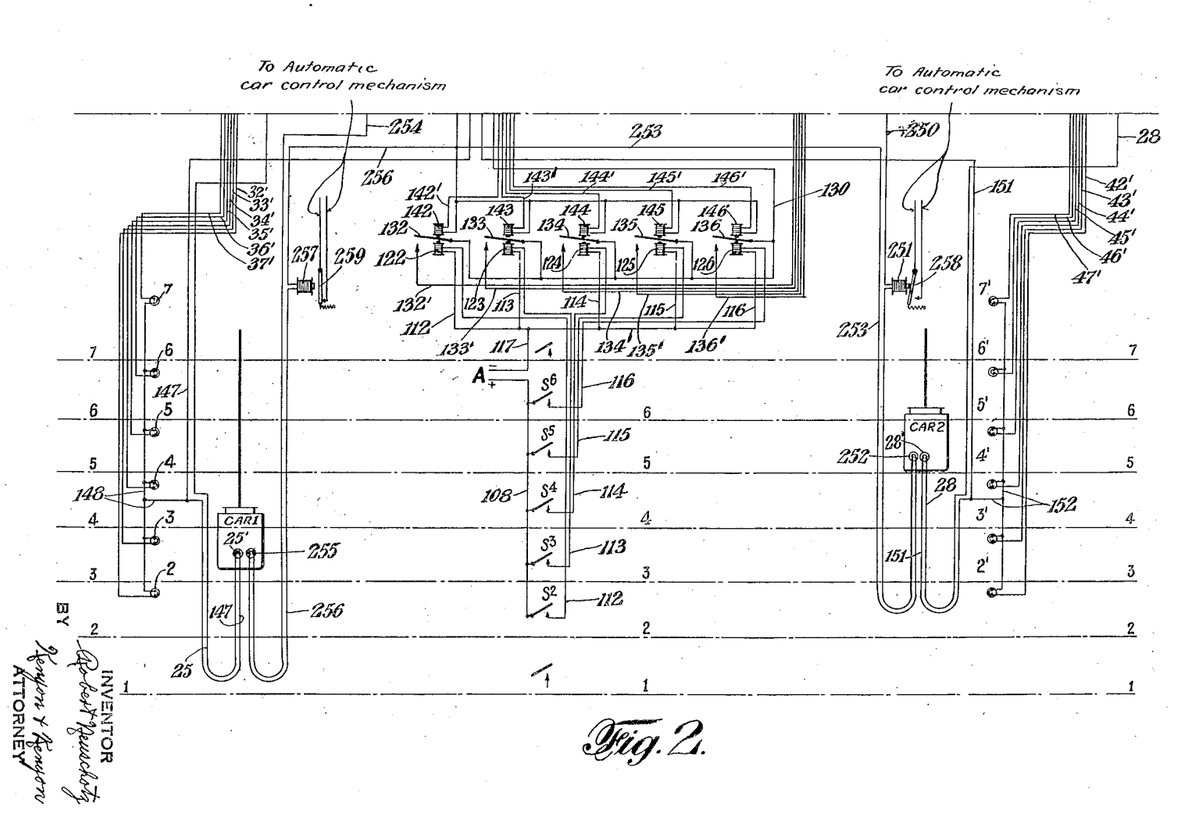

Referring now to the drawings in Figs. 1 and 2, the apparatus illustrated therein represents that used in connection with two elevators and especially mechanism made operative during the up movement of two elevators serving a building seven floors in height. The mechanism made operative during the down movement of the same elevators would be a duplication of the illustrated apparatus and for purposes of brevity is omitted from this description.

In the control room of the elevator system, there is located a selective signal commutator for car No. 1 composed of a number of bars 10, while a similar commutator for car No. 2 is composed of a pair of bars 10'. Corresponding bars 10 and 10' are connected by means of conductors 11, only one of which is illustrated herein for purposes of brevity. Similarly situated in the control room is a commutator utilized in connection with the floor lantern signals, such commutator for car 1 being composed of bars 12, 13, 14, 15, 16 and 17 representing the respective floors 2 to 7 inclusive. A similar commutator made up of bars 12', 13', 14', 15', 16' and 17' serves the same purpose for car No. 2. The bars 12 to 17 inclusive and 12' to 17' inclusive are connected in parallel, each corresponding bar connected with the other by means of conductors 18, 19, 20, 21 and 22 respectively.

Slidable along the length of the commutator composed of bars 12 to 17 inclusive is a contact member 23 having spaced therefrom and insulated therefrom a second contact member 24. Connected to contact member 23 is a line 25 which extends to the car signal lantern 25' in car No. 1. Similar contact members 26 and 27 slide along the commutator made up of bars 12' to 17' and a line 28 extends from contact member 26 to the car lantern signal 28' in car 2.

Oppositely located from the commutator made up of bars 12 to 17 is a similar commutator made up of bars 32, 33, 34, 35, 36 and 37 which aid in controlling the floor lantern signal. A similar commutator made up of bars 42, 43, 44, 45, 46 and 47 co-operates in the same manner with respect to car No. 2. The bars 32 to 37 inclusive are connected to the floor lantern signals 2, 3, 4, 5, 6, and 7 by means of conductors 32', 33', 34', 35', 36' and 37' respectively; while bars 42 to 47 inclusive are connected to the floor lantern signals for car No. 2; that is, signal members 2', 3', 4', 5', 6', and 7' by conductors 42' to 47' inclusive respectively.

An additional commutator made up of a number of bars 29 is associated with a part of the circuit hereafter termed pre-reset circuits associated with car No. 1, while a similar commutator made up of bars 29' is associated with car No. 2. Each of the corresponding commutator bars 29 and 29' are connected by means of conductors 30, only one of which is illustrated for simplicity.

For resetting the signals of car No. 1, the usual commutator made up of bars 52, 53, 54, 55 and 56 is provided, such bars being connected to a similar commutator for car No. 2 made up of bars 52' to 56' inclusive by means of conductors 57, 58, 59, 60 and 61 respectively. For aiding in the pre-resetting of signals, a commutator for car No. 1 made up of bars 62, 63, 64, 65 and 66 is provided and a similar commutator made up of bars 62' to 66' inclusive is provided for car No. 2. The corresponding bars 62 to 66 and 62' to 66' inclusive are connected by means of conductors 67, 68, 69, 70 and 71 respectively which are common for a portion thereof with the conductors 57 to 61 inclusive.

Slidable along the commutator made up of bars 10 is a contact member composed of a number of contact points 75 interconnected and connected to a similar contact member made up of points 75' slidable along the commutator made up of bars 10'. Slidable along with but insulated from the member made up of points 75 is a single contact member having a single point 77, while a similar point 78 moves simultaneously with the member made up of points 75'. The contact point 77 is connected by a line 79 through spring-closed switch 80 through magnet or relay 81 to conductor 82 which in turn is connected to the negative side of a source of low voltage B. Contact point 78 is connected by line 84 through spring-closed switch 85, magnet or relay 86, conductor 87, to conductor 82 and thence through conductor 83 to the negative side of the same source of low voltage B. The common conductor 76 connecting the contact points 75 and 75' is connected to the positive side of the source B by means of line 88.

Slidable contact member 89 is provided for contacting with the commutator bars 52 to 56 inclusive, which contact 89 is connected by line 90 through spring-closed switch 91 to the positive side of source B. A similar contact member 89' slidable along and contacting with the bars 52' to 56' is connected by line 92 through spring-closed switch 93 to the positive side of source B.

Slidable along the commutator made up of bars 29 is a contact member composed of a number of interconnected points 94 which are connected by line 95 with a similar contact member composed of points 94' slidable along the commutator made up of bars 29'. Moving simultaneously with the points 94 but insulated therefrom is a member made up of point 96 connected by line 97 through magnet 98 to the line 90 which, as before explained, connected through the spring-closed switch 91 to the positive side of source B. A similar point 99, movable along the commutator bars 29', is connected by line 100 through magnet 101 to line 92 which, as before explained, is connected through spring-closed switch 93 to the positive side of source B.

Sildable along and contacting with bars 62 to 66 inclusive is a contact point 102 connected by line 103 through the spring-opened switch 104 to line 97. A similar contact point 105 slidable along the bars 62' to 66' inclusive is connected by line 106 through spring-opened switch 107 to the line 100.

Located on each of the floors 2 to 6 inclusive is a switch for signaling the elevators when it is desired to board them during their upward travel. These switches are indicated by $S^2$, $S^3$, $S^4$, $S^5$ and $S^6$ for the respective floors 2 to 6 inclusive. A source of low voltage A is connected to one side of each of these switches by means of line 108. Switch $S^2$ has its circuit completed by means of line 112 which passes through magnet 122 back to a common line 117 connected with the negative side of source A. Switch $S^3$ has its circuit closed through line 113 passing through magnet 123 to the same common line 117. Similar lines 114, 115 and 116 and similar magnets 124, 125 and 126 are provided for the remaining floors. The energization of the respective magnets 122 to 126 inclusive by the closing of the switches $S^2$ and $S^6$ inclusive causes the closing of switches 132 to 136 inclusive. From the negative side of a source of high potential C, a conductor 130 extends to each of the switches 132 to 136, inclusive in parallel. From the other side of each of these switches 132 to 136 inclusive, lines 132' to 136' inclusive extend to and in contact with the conductors 18 to 22 inclusive respectively.

A series of magnets 142 to 146 inclusive are associated with the switches 132 to 136 inclusive respectively, such magnets serving when energized to open these switches and to thereby restore the signaling system to normal inactive condition. The circuit through each of these magnets 142 to 146 inclusive may be traced from the negative side of source B through conductor 83 through the magnets and from the respective magnets through conductors 142' to 146' inclusive and respectively to the lines 57 to 61 inclusive respectively.

For the completion of the circuit energizing the car signal lantern 25', conductor 147 leads therefrom through magnet 149 through spring-closed switch 150 to the opposite side of the source of high potential C. This return wire 147 serves in the same capacity with respect to the floor lantern signals 2 to 7 inclusive which are connected in parallel by conductors 148 to the return line 147. A similar return line 151 extends from car signal lantern 28' of car 2 through magnet 153, spring-closed switch 154, and thence to the positive side of source of high voltage C.

Connected in shunt to conductor 84 is a conductor 250 which passes through a magnet 251, to a lantern 252 in car No. 2 and from this lantern a conductor 253 extends into contact with line 83 connected to the negative side of source of power B. A conductor 254 is similarly connected in shunt to conductor 79, and to lantern 255 in car No. 1 from which a conductor 256 extends passing through magnet 257 into contact with line 83. Energization of magnet 251 opens a switch 258 which renders ineffective the apparatus utilized in the automatic control of car No. 2 in response to floor signals. This type of automatic control apparatus is well known in the art and, since it forms no part of the present invention, it is not illustrated herein. Energization of magnet 257 opens a switch 259 similar to switch 258, rendering ineffective automatic control apparatus for car No. 1.

One simple method of causing an automatically operated vehicle to pass through an active signal zone without receiving such signal because of the presence within a predetermined distance of a second vehicle, would be to tie in the circuits of armatures 258 and 259, respectively, across the lines of car lanterns 28' and 25'. Each such circuit, which is labeled "to automatic car control mechanism" will also contain a relay which when energized attracts a similar armature in the motor circuit so bringing the vehicle to a stop. Assuming for the moment that car 1 and car 2 of vehicles 1 and 2 are automatic, and that car 2 has not yet entered any active signal zone and that car 1 is within a predetermined distance thereof, then lantern 252 of car 2 will be energized, as will be the relay 251 in the same circuit. Activation of relay 251 draws over armature 258, breaking the circuit of armature 258, so that the relay therein cannot stop the vehicle and it will pass through the active signal zone in a manner identical with that when cars 1 and 2, as illustrated, are manually controlled.

Having described the component parts of the apparatus embodied in this invention, the operation of the system under varying conditions is substantially as follows. For purposes of explanation, consider the first condition as one in which car No. 2 is traveling upward in its hatch more than a predetermined distance ahead of car No. 1. In the drawings, car No. 2 is illustrated as being either stationary or moving at exactly the landing of floor number 5; the bridge contacts 26, 27, the contact points 75' and 78, the contact points 94' and 99, and points 89' and 105 all moving simultaneously with the elevator to come into contact with the proper commutator bars. With car No. 2 in this position, a signal is initiated at the sixth floor indicating that it is desired for the car to stop at this floor and take on passengers. For these purposes, the switch S⁶ is closed, completing a circuit from the positive side of source A, through the switch, through line 116, through magnet 126 and back to the negative side of source A through conductor 117. The energization of magnet 126 closes switch 136 which completes a circuit from the negative side of high potential C through conductor 130, switch 136, conductor 136', conductor 22, commutator bar 16', bridge contact 26, commutator bar 46, through conductor 46' to the floor lantern 6' and from thence to the return lead 151. At the same time, the bridging of bars 16' and 46 permit the closing of a shunt circuit from the bar 16' through conductor 28 to the car signal lantern 28' and thence to return lead 151 from which the circuit extends through magnet 153, which opens the switch 85, through switch 154 and back to the positive side of source of high potential C. It will be seen that the completion of this main circuit and the shunt circuit causes the lighting of the floor signal lantern 6' and also the lighting of the car signal lantern 28'. The purpose of magnet 153 is to prevent the negating of a signal after a car has once received the same and the manner of this operation will be explained in detail hereinafter.

The car 2 having received the sixth floor signal, it moves upwardly approaching the sixth floor. Before it reaches this floor, however, the contact 26 moves out of bridge position relative to the bar 16' and 46 and hence the shunt circuit including the car signal lantern 28' is no longer energized, permitting the light to return to off position so that when the car moves into the signal shunt of the next floor, namely, the seventh, it will be possible to give the operator of the car the signal. However, the floor lantern on the sixth floor remains lighted for the reason that the contact 27 is in bridge relation to the bars 16' and 46 up until the time the car moves away from the sixth floor. The car then having answered the sixth floor signal, moves on upwardly until the contact 27 is out of bridge relation to bars 16' and 46. During this time the magnet 126 is of course no longer energized but the switch 136 remains closed until opened by magnet 146. Just as the car passes or leaves the sixth floor, the contact 89' comes into engagement with the bar 56' of the reset commutator, thereby closing a circuit as follows. From the negative side of the source B through conductor 83 through the magnet 146, conductor 146', conductor 61, bar 56', contact 89', conductor 92, switch 93 to the positive side of the source B. By energizing this magnet 146, the switch 136 is opened, breaking the circuit which causes the energization of the floor signal lantern 6' deenergizing the same and restoring the entire system to its prior normal condition.

Let it be assumed that the cars 1 and 2 are moving upwards in their shafts, whether the same shaft or different shafts, No. 2 ahead of No. 1 and No. 1 within a predetermined distance of No. 2. As the cars move along, the contact points 75 and 77 along one commutator and 75' and 78 along the other move simultaneously therewith. When these cars are within a predetermined distance of each other, it is possible for a circuit to be closed due to the proximity of the cars since the commutator bars 10 and 10' are connected in parallel arrangement, one bar of one set being connected to the corresponding bar of the other set. With this in mind, it is possible when car No. 1 is at the position indicated in the drawings, to trace a circuit as follows. From the negative side of the source B through conductor 83, conductor 82, conductor 87, magnet 86, conductor 84 and switch 85 to the point 78 and from this point through one of bars 10' through the conductor 11 connected thereto and thence to the bar 10 corresponding to the one with which 78 is in contact into any one of the points 75 which may be in contact therewith, through conductor 88 to the positive side of source B. The energization of magnet 86 opens switches 154 and 93, and, due to the opening of this switch 154, it will be impossible for either the lantern 28' of car 2 or the floor lantern of the floor signaling to be energized by the moving of contact 26 into bridging relation with the commutator bars corresponding to the floor signaling, inasmuch as the signaling circuit must be completed as before explained by passage of current partially in the line 151 through switch 154. At the same time, the shunt circuit through magnet 251 and lantern 252 is completed.

Under these conditions, let it be assumed that the sixth floor switch S⁶ is closed. Car No. 2 cannot receive the signal due to the opening of switch 154 and accordingly it passes by the sixth floor. Moreover, car No. 2 in passing this floor cannot reset the signals of this floor since the reset circuit through switch 93 has been broken by energization of magnet 86 and therefore it is possible for the signals to be received by car No. 1 when it enters the signal zone. The closing of switch S⁶, however, has energized magnet 126, thereby closing switch 136, and this switch remains closed even though car No. 2 passes by the sixth floor. If the system of operation of the elevators is full manual control, the cut-out relays may be dispensed with and the lantern 252 utilized to give a visual signal to the operator to disregard the floor signal (which he would have received in the absence of the cut-out relays) and to continue on until the lantern 252 is no longer energized, at which time car No. 2 will be far enough ahead of car No. 1 to answer signals without disturbing the normal schedule of the cars. In the event the operation of the elevators is automatic;—that is, a signal from a floor causes automatic stopping of the first car approaching that floor,—the magnet 251 may be used to render ineffective the automatic control apparatus, and, at the same time, if desired, the lantern 252 will indicate to the operator that his signals are being negated. Further considering this situation, whether the lantern 252 and magnet 251 are utilized or not, car No. 1, in following car No. 2 will move upwardly until the contact 23 bridges the bars 16 and 36, at which instant a circuit will be set up as follows. From the negative side of source C through conductor 130, through switch 136, conductor 136', conductor 22, bar 16, contact 23, bar 36, conductor 36' to the floor lantern 6 and from the floor lantern 6 through conductor 148, conductor 147, relay 149, switch 150 to the positive side of source C, thereby energizing the floor signal. At the same time a shunt circuit from contact 23 through conductor 25 to the car signal lantern 25' and thence to conductor 147 will be closed, energizing the car signal lantern and giving the operator a visual signal to stop at the sixth floor. Of course, the energization of magnet 149 assures that any succeeding car, if there are more than two cars in series, cannot negate the signal of car No. 1 after it has received the same. As car No. 1 approaches the sixth floor, its car signal will be deenergized and as it leaves the sixth floor, the floor lantern will be deenergized and switch 136 opened in a manner corresponding to that explained in connection with car No. 2 hereinbefore, use being made of the reset commutator 56 and contact 89 in place of reset commutator 56' and contact 89'.

Let it be assumed that car No. 2 has been signaled by the sixth floor at a time when car No. 1 is not within a predetermined distance of car No. 2. Car No. 2 receives the signal as indicated by energization of the lantern 28', and the floor lantern 6' is also energized. During the closing of the circuits as before explained, magnet 153, upon being energized, opens the switch 85 so that, should car No. 1 approach No. 2 within the predetermined distance, it will be impossible to close the circuit from the negative side of the source B through conductor 83, conductor 82, conductor 87, magnet 86, conductor 84, switch 85, etc., since this switch is open and hence the cutouts of car No. 2's signals cannot be affected.

However, when one car has accepted a signal and is approaching the floor in answer to the same or is standing at that floor and a second car moves into the signal zone of that floor, it is desirable that the second car, in most cases, shall not receive the signal and make the unnecessary stop at that floor. For this purpose, the pre-reset equipment is provided in the present invention.

Let it be assumed that car No. 2 has received a signal for the fifth floor and is standing at this floor as shown in the drawings and car No. 1 moves into the fifth floor signal zone. As it approaches this signal zone and before it is possible for the contact 23 to bridge the bars 15 and 35 and thereby cause the energization of car signal lantern 25' and floor lanterns, the following circuit is closed. From the negative side of source B through conductor 83 through conductor 95 through one of the contacts 94 through one of the commutator bars 29 across through conductor 30 to the corresponding bar 29', thence to contact 99, conductor 100, magnet 101, into the conductor 92 and through the switch 93 to the positive side of source B. At the same time, a shunt circuit is closed as follows. From the conductor 83 through the magnet 145, then through conductor 145', conductor 60, conductor 70, commutator bar 65', contact 105, conductor 106, switch 107 into the line 100, since the energization of the main circuit has closed this switch 107, permitting the energization of magnet 145. The energization of magnet 145 causes the opening of switch 135 so that it will be impossible to complete a circuit through the car lantern 25' or the floor signal lantern 5 when the contact 23 bridges commutator bars 15 and 35.

Assume that car No. 2 is standing or closely approaching the fifth floor in answer to the fifth floor signal which it had received while car No. 1 is without the predetermined distance. Before car No. 2 reaches the fifth floor or while it is standing at the fifth floor, the sixth floor signals in the manner before explained, and as a result thereof the car signal lantern 28' is energized and the floor lantern 6' also energized. Before car No. 2 leaves the fifth floor, car No. 1 enters within the predetermined distance and enters the signaling zone of the fifth floor. As soon as it reaches this signaling zone, the fifth floor signals are pre-reset in the manner before explained, but before car No. 2 leaves the fifth floor car No. 1 moves into the sixth floor signaling zone. As it so moves, the contact 23 bridges the bars 16 and 36, closing the usual signal circuit to energize the floor lantern 6 and car signal lantern 25'. Under these conditions, both cars have received the signal for the sixth floor but it is desirable that only one should answer or accept the signal. With car No. 2 standing at the fifth floor, car No. 1 moves past the fifth floor to accept the sixth floor signal, and by passing the car No. 2 the signal of the sixth floor received by car No. 2 is negated in the following manner to permit the operator of car No. 2 to pass by the sixth floor since this car is now in effect the second car of the ascending series of cars. As car No. 1 approaches the sixth floor, the contact arm carrying the points 94 and the point 96 moves upward along the bars 29 until its position is higher on these bars than the position of the arm carrying the points 94' and the point 99 on the bars 29'. For this reason, it is possible to complete the following circuit. From the negative side of the source B through the conductor 83 to the conductor 95 to one of the points 94' and to the bar 29' with which it is in contact; from this bar 29' to the bar 29 with which it is connected by means of a conductor 30 (not shown) and from this bar 29 through the point 96, conductor 97, through magnet 98, conductor 90, switch 91 to the positive side of source B. By the completion of this circuit the magnet 98 upon being energized closes switch 104, permitting the completion of a shunt circuit as follows. From the conductor 83 through magnet 146, conductor 146', conductor 61, conductor 71, bar 66, point 102 which is now in contact with this bar, conductor 103, switch 104 to the conductor 97. The closing of this shunt circuit opens switch 136, thereby breaking the signaling circuit caused by the bridging of bars 16' and 46 by contact 26. In so breaking this signaling circuit, the car signaling lantern 28' and the floor lantern 6' are deenergized, negating the sixth floor signals. This signal 28' having been deenergized, the operator knows that car No. 1 has moved into position to accept the sixth floor signal, and as a result car No. 2 can be operated to pass the sixth floor without stopping.

Figure 3:
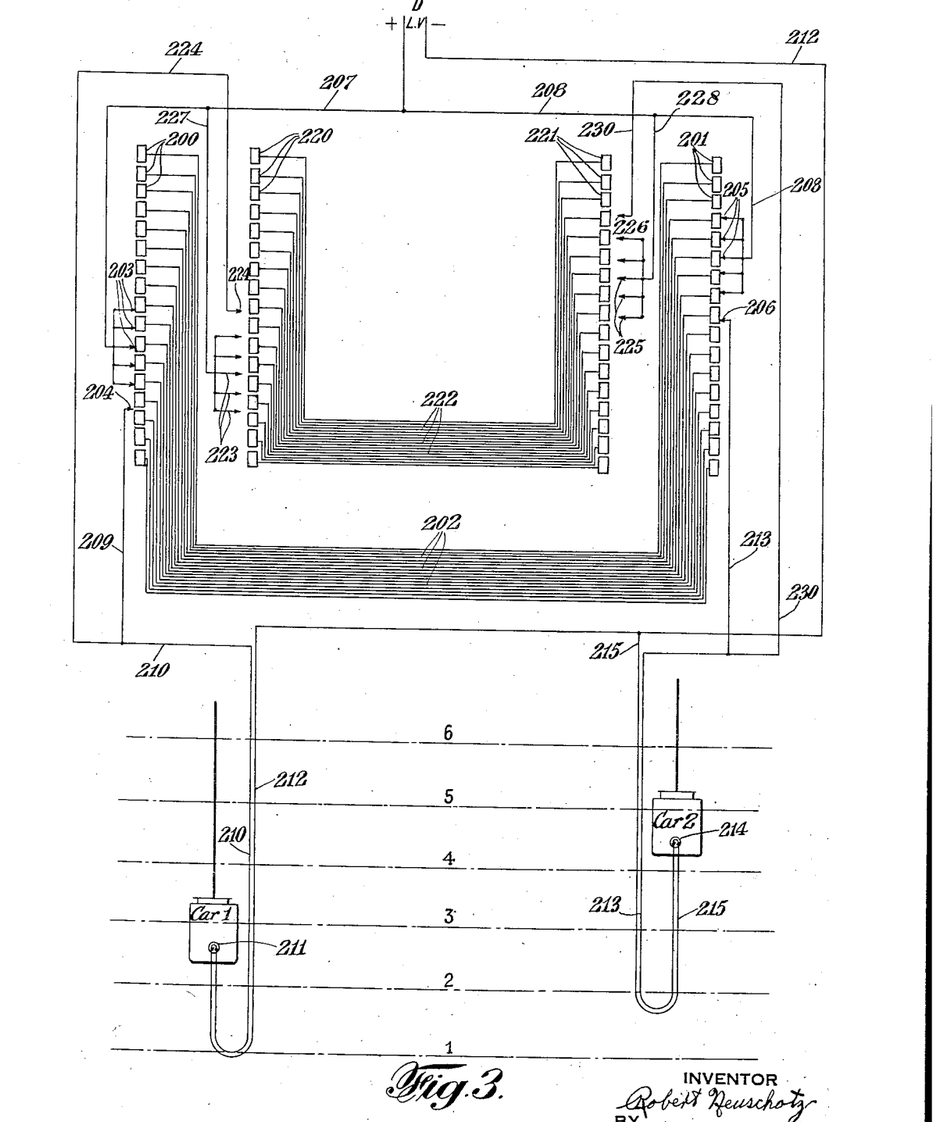
Fig. 3 represents diagrammatically the circuit arrangement and apparatus used in connection with visual signal indications for notifying the operator of one vehicle when another is within a predetermined distance thereof.

Referring now to Fig. 3, of the drawings, the system illustrated therein represents an adaptation of the principle of selective signaling embodied in the arrangement illustrated in Figs. 1 and 2. The apparatus illustrated in this figure is for the express purpose of providing a visual indication to the operator of a vehicle such as an elevator car when a second vehicle is within a predetermined distance of the first whether this distance be ahead or behind the same. More specifically the apparatus consists of a selective commutator for car No. 1 composed of a plurality of commutator segments 200 and a similar selector commutator for car No. 2 composed of a plurality of commutator segments 201. The corresponding segments of each commutator are connected together by means of individual lines 202 whereby each commutator bar is connected to the corresponding bar in parallel.

Slidable along and contacting with the segments 200 is a brush member composed of a plurality of contact points 203 and a single contact point 204 insulated from the points 203. A similar brush member composed of points 205 and point 206 insulated therefrom is in slidable contact with segments 201. The contact points 203 as shown are connected together in parallel and are connected to the positive side of a source of low voltage D by means of conductor 207 while the points 205 are likewise connected to the same side of source D by conductor 208. The point 204 is connected through conductor 209, conductor 210 to the car signal lantern 211 (which is in addition to the regular floor signal car lantern of the elevator) the circuit of this extra lantern 211 continuing through conductor 212 to the negative side of source D. The point 206 is likewise connected through a conductor 213 with a lantern 214 in the car No. 2 and the circuit continued through conductor 215 to conductor 212 and thence to the negative side of source D.

It is to be understood from the foregoing that the arrangement illustrated is for use in connection with the two cars when they are moving in up direction. Similar apparatus is provided for use with the cars when they are traveling in down direction, this apparatus consisting of a selective commutator composed of segments 220 for car 1, a similar commutator for car 2 composed of segments 221, the corresponding segments of the two commutators being connected by lines 222; a brush member composed of contact points 223 connected together and the single contact point 224 insulated from the points 223; a brush member composed of contact points 225 connected together and a single point 226 insulated from points 225. The points 223 are connected to the line 207 by means of line 227 while points 225 are connected to line 208 through line 228. The point 224 is connected to the signal lantern 211 by means of conductor 224 and conductor 210 while the point 226 is connected to lantern 214 by means of conductor 230 and conductor 213.

The operation of the apparatus illustrated is substantially as follows: Assuming the cars to be in the position indicated, that is, with car No. 1 approaching the third floor and car No. 2 leaving the fourth floor, it will be seen that the brush member made up of points 203 and point 204 is sliding along commutator segments 200 in accordance with the movement and position of car 1 while the points 205 and point 206 are sliding along and in position corresponding to the position of car No. 2. From this it will be seen that a circuit can be traced as follows: From the negative side of source D through conductor 212, conductor 215, lantern 214, line 213, contact member 206 across one of the lines 202 to the corresponding segment 200 and through one contact point 203 and line 207 to the positive side of source D. By this arrangement the signal lantern 214 is energized, giving a visual indication to the operator that car No. 1 is within a predetermined distance behind car No. 2 so that the operator of car No. 2 can cut out the signals and continue on until he has increased the distance between the car to exceed the predetermined minimum. If car No. 1 is not within the predetermined distance of car No. 2 a circuit cannot be closed through lamp 214 for the reason that a circuit cannot be closed from one segment 201 with which member 206 is in contact to a corresponding segment 200 since the contacts 203 are further down the group of bars.

When the cars are moving in a down direction the same action will be accomplished by the utilization of the down selective mechanism, the contact members at that time being in engagement with the segments 220 and 221. The system hereinbefore described provides an arrangement whereby it is possible to visually indicate to the operator of the car a condition wherein a second car is within a predetermined distance behind the first car. In some instances it may be desirable to operate the system in a reverse manner, that is, to indicate to the second car when it is within a predetermined distance of a preceding car. To accomplish this, it is only necessary to re-arrange the position of the single contact member of each of the brushes, that is, to position the contact member 204 on the other side of the members 203, the member 206 on the other side of the members 205, etc. By so reversing the position of the single contact members, the reverse condition of signaling will be accomplished.

The signal control system illustrated in Figs. 1 and 2 may likewise be arranged for selective control operable to stop the first car of a series of moving cars when another is within a predetermined distance thereof and cause the second car to pass by without receiving a signal by mere reversal of the contact members sliding along the commutator bars. For example, in Fig. 1 the signal contact member 78, instead of following the contacts 75', would precede these contacts moving along the bars 10'. The other signal contacts of the series sliding along the various commutator bars would likewise be reversed in position.

It will be evident from the foregoing that the present invention provides an arrangement for selectively controlling the signal apparatus associated with a number of vehicles moving in the same direction whether these vehicles be elevators moving in a number of hatches or moving in a single hatch, or the system may be utilized likewise in connection with any type of horizontally-moving vehicles as distinguished from vertically-moving vehicles. As described in connection with elevators, the arrangement provides a system whereby it is possible to keep elevators operating on approximate schedule by cutting out the signals of one elevator when another is too close thereto as a result of an excessive number of stops on the part of the first elevator, which cutting out of signals may be automatic or which may be manually controlled, and the condition necessitating the same may be indicated visually to the operator of the car. If the operation system of the elevator be automatic; that is, one in which the cars are stopped at signaling floors automatically upon the reception of a signal from that floor, the arrangement provides a system for rendering this automatic stopping apparatus ineffective with respect to one car when another is within a predetermined distance thereof. If so desired, all parts of the system may be combined in one installation; that is, the selective control mechanism for cutting out the signals of one car, the visual signal for indicating this condition to the operator, and the cutting out of the automatic stop mechanism associated therewith.

It is to be understood that the present invention is not to be limited by the illustrated embodiments, but is to be limited only by the scope of the following claims.

I claim:

1. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof and means rendering said preventing means inoperative when the signal device within one of said vehicles responds upon approaching a signaling station more than a predetermined distance from another of said vehicles if thereafter this last-named vehicle comes within said predetermined distance.

2. The combination with a plurality of vehicles moving in the same direction between a plurality of stations, of signal devices within said vehicles, means for actuating said devices, means at each of said stations for conditioning said actuating means for energization when a vehicle approaches said station and means for preventing the signal device within the first of said vehicles from being actuated when a second vehicle is within a predetermined distance therebehind and means rendering said preventing means inoperative when the signal device within said first vehicle response upon approaching a signaling station more than a predetermined distance from said second vehicle if thereafter said second vehicle comes within said predetermined distance of the first.

3. The combination with a plurality of vehicles moving in the same direction between a plurality of stations, of signal devices within said vehicles, means for actuating said devices, means at each of said stations for conditioning said actuating means for energization when a vehicle approaches said station and means for preventing the signal device within one of said vehicles from being actuated when another of said vehicles is within a predetermined distance thereof, means rendering said preventing means inoperative when the signal device within one of said vehicles responds upon approaching a signaling station more than a predetermined distance from another of said vehicles if thereafter this last-named vehicle comes within said predetermined distance, and means normally de-energizing said actuating means when the signal-receiving one of said vehicles passes a predetermined length beyond said station.

4. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means rendering said preventing means inoperative when the signal device within said first vehicle responds upon approaching a signaling station more than a predetermined distance from said second vehicle if thereafter said second vehicle comes within said predetermined distance of the first, and means for de-energizing said actuating means upon the approach of said second vehicle as it reaches a predetermined length in advance of said signaling station.

5. The combination with a plurality of vehicles moving in the same direction between a plurality of stations, of signal devices within said vehicles, means for actuating said devices, means at each of said stations for conditioning said actuating means for energization when a vehicle approaches said station, and means for de-energizing said actuating means when one of said vehicles is within a predetermined length of a signaling station upon the approach of another vehicle and before said last-named vehicle enters said predetermined length of said signaling station.

6. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof, and means for de-energizing said actuating means when one of said vehicles is within a predetermined length of a signaling station upon the approach of another vehicle and before said last-named vehicle enters said predetermined length of said signaling station.

7. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, and means for de-energizing said actuating means when one of said vehicles is within a predetermined length of a signaling station upon the approach of another vehicle and before said last-named vehicle enters said predetermined length of said signaling station.

8. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means rendering said preventing means inoperative when the signal device within said first vehicle responds upon approaching a signaling station more than a predetermined distance from said second vehicle if thereafter said second vehicle comes within said predetermined distance of the first, and means de-energizing said actuating means when the signal receiving one of said vehicles passes a predetermined length beyond said station.

9. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof, means de-energizing said actuating means when the signal-receiving one of said vehicles passes a predetermined length beyond said station, and means for de-energizing said actuating means when one of said vehicles is within a predetermined length of a signaling station upon the approach of another vehicle and before said last-named vehicle enters said predetermined length of said signaling station.

10. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means de-energizing said actuating means when the signal-receiving one of said vehicles passes a predetermined length beyond said station, and means for deenergizing said actuating means when one of said vehicles is within a predetermined length of a signaling station upon the approach of another vehicle and before said last-named vehicle enters said predetermined length of said signaling station.

11. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means for de-energizing said actuating means when said last-named vehicle leaves said station, and means for de-energizing said actuating means when one of said vehicles is within a predetermined length of a signaling station upon the approach of another vehicle and before said last-named vehicle enters said predetermined length of said signaling station.

12. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof, means rendering said preventing means inoperative when the signal device within one of said vehicles responds upon approaching a signaling station more than a predetermined distance from another of said vehicles if thereafter this last-named vehicle comes within said predetermined distance, and means for de-energizing said actuating means when one of said vehicles is within a predetermined length of a signaling station upon the approach of another vehicle and before said last-named vehicle enters said predetermined length of said signaling station.

13. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means rendering said preventing means inoperative when the signal device within said first vehicle responds upon approaching a signaling station more than a predetermined distance from said second vehicle if thereafter said second vehicle comes within said predetermined distance of the first, means de-energizing said actuating means when the signal-receiving one of said vehicles passes a predetermined length beyond said station, and means for de-energizing said actuating means when one of said vehicles is within a predetermined length of a signaling station upon the approach of another vehicle and before said last-named vehicle enters said predetermined length of said signaling station.

14. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof, means for de-energizing said actuating means when one of said vehicles is within a predetermined length of a signaling station upon the approach of another vehicle and before said last-named vehicle enters said predetermined length of said signaling station, means for preventing said first-named vehicle from opening said signaling circuit as it passes said predetermined length beyond said station when said second-named vehicle is within a predetermined distance thereof, and means for de-energizing said actuating means when the signal-receiving one of said vehicles passes a predetermined length beyond said station.

15. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means for de-energizing said actuating means when said last-named vehicle leaves said station, means for de-energizing said actuating means when one of said vehicles is within a predetermined length of a signaling station upon the approach of another vehicle and before said last-named vehicle enters said predetermined length of said signaling station, and means for preventing the de-energization of said actuating means when said first and non-signal-receiving vehicle passes said signaling station.

16. The combination with a plurality of vehicles moving in the same direction between a plurality of stations, of signal devices within said vehicles, means for actuating said devices, means at each of said stations for conditioning said actuating means for energization when a vehicle approaches said station, means for de-energizing said actuating means when a vehicle leaves said station, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize the signals within both corresponding to the next successive signal station when the signal devices within said vehicles have been actuated from said next successive station.

17. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means for de-energizing said actuating means by said last-named vehicle, and means for de-energizing said actuating means when one of said vehicles is within a predetermined length of a signaling station upon the approach of another vehicle and before said last-named vehicle enters said predetermined length of said signaling station.

18. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means for de-energizing said actuating means by said last-named vehicle, means for de-energizing said actuating means when one of said vehicles is within a predetermined length of a signaling station upon the approach of another vehicle and before said last-named vehicle enters said predetermined length of said signaling station, and means for preventing the de-energization of said actuating means when said first and non-signal-receiving vehicle passes said signaling station.

19. The combination with a plurality of vehicles moving in the same direction between a plurality of stations, of signal devices within said vehicles, means for actuating said devices, means at each of said stations for conditioning said actuating means for energization when a vehicle approaches said station, means for de-energizing said actuating means, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize the signals within both corresponding to the next successive signal station when the signal devices within said vehicles have been actuated from said next successive station.

20. The combination with a plurality of vehicles moving in the same direction between a plurality of stations, of signal devices within said vehicles, means for actuating said devices, means at each of said stations for conditioning said actuating means for energization when a vehicle approaches said station, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize the signals within said vehicles have been actuated from said next successive station.

21. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize the signals within both corresponding to the next successive signal station when the signal devices within said vehicles have been actuated from said next successive station.

22. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize the signals within both corresponding to the next successive signal station when the signal devices within said vehicles have been actuated from said next successive station.

23. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof, means de-energizing said actuating means when the signal-receiving one of said vehicles passes a predetermined length beyond said station, means for de-energizing said actuating means when one of said vehicles is within a predetermined length of a signaling station upon the approach of another vehicle and before said last-named vehicle enters said predetermined length of said signaling station, means operable upon the continuing of said second vehicle past said first while the first is approaching or standing at the signaling station to de-energize the signals within both corresponding to the next successive signal station when the signal devices within said vehicles have been actuated from said next successive station.

24. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means de-energizing said actuating means when the signal-receiving one of said vehicles passes a predetermined length beyond said station, means for deenergizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to deenergize the signals within both corresponding to the next successive signal station when the signal devices within said vehicles have been actuated from said next successive station.

25. The combination with a plurality of vehicles moving in the same direction between a plurality of stations, of signal devices within said vehicles, means for actuating said devices, means at each of said stations for conditioning said actating means for energization when a vehicle approaches said station, means for preventing the signal device within one of said vehicles from being actuated when another of said vehicles is within a predetermined distance therebehind, means for de-energizing said actuating means when said last-named vehicle leaves said station, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize signals within both corresponding to the next successive signal station when the signal devices within said vehicles have been actuated from said next successive station.

26. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means for de-energizing said actuating means by said last-named vehicle, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize the signals within both corresponding to the next successive signal station when the signal devices within said vehicles have been actuated from said next successive station.

27. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof, means rendering said preventing means inoperative when the signal device within one of said vehicles responds upon approaching a signaling station more than a predetermined distance from another of said vehicles if thereafter this last-named vehicle comes within said predetermined distance, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize the signals within both corresponding to the next successive signal station when the signal devices within said vehicles have been actuated from said next successive station.

28. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means rendering said preventing means inoperative when the signal device within said first vehicle responds upon approaching a signaling station more than a predetermined distance from said second vehicle if thereafter said second vehicle comes within said predetermined distance of the first, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize the signals within both corresponding to the next successive signal station when the signal devices within said vehicles have been actuated from said next successive station.

29. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof, means rendering said preventing means inoperative when the signal device within one of said vehicles responds upon approaching a signaling station more than a predetermined distance from another of said vehicles if thereafter this last-named vehicle comes within said predetermined distance, means de-energizing said actuating means when the signal-receiving one of said vehicles passes a predetermined length beyond said station, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize the signals within both corresponding to the next successive signal station when the signal devices within said vehicles have been actuated from said next successive station.

30. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means rendering said preventing means inoperative when the signal device within said first vehicle responds upon approaching a signaling station more than a predetermined distance from said vehicle if thereafter said second vehicle comes within said predetermined distance of the first, means de-energizing said actuating means when the signal-receiving one of said vehicles passes a predetermined length beyond said station, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize the signals within both corresponding to the next successive signal station when the signal devices within said vehicles have been actuated from said next successive station.

31. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof, means de-energizing said actuating means when the signal-receiving one of said vehicles passes a predetermined length beyond said station, means for de-energizing said actuating means when one of said vehicles is within a predetermined length of a signaling station upon the approach of another vehicle and before said last-named vehicle enters said predetermined length of said signaling station, means for preventing said first named vehicle from opening said signaling circuit as it passes said predetermined length beyond said station when said second-named vehicle is within a predetermined distance thereof, and means operable upon the continuing of said second vehicle past said first while the first is approaching or standing at the signaling station to de-energize the signals within both corresponding to the next successive signal station when the signal devices within said vehicles have been actuated from said next successive station.

32. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means de-energizing said actuating means when the signal-receiving one of said vehicles passes a predetermined length beyond said station, means for de-energizing said actuating means when one of said vehicles is within a predetermined length of a signaling station upon the approach of another vehicle and before said last-named vehicle enters said predetermined length of said signaling station, means for preventing said first-named vehicle from opening said signaling circuit as it passes said predetermined length beyond said station when said second-named vehicle is within a predetermined distance thereof, and means operable upon the continuing of said second vehicle past said first while the first is approaching or standing at the signaling station to de-energize the signals within both corresponding to the next successive signal station when the signal devices within said vehicles have been actuated from said next successive station.

33. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means for de-energizng said actuating means by said last-named vehicle, means for de-energizing said actuating means when one of said vehicles is within a predetermined length of a signaling station upon the approach of another vehicle and before said last-named vehicle enters said predetermined length of said signaling station, means for preventing said first named vehicle from opening said signaling circuit as it passes said predetermined length beyond said station when said second-named vehicle is within a predetermined distance thereof, and means operable upon the continuing of said second vehicle past said first while the first is approaching or standing at the signaling station to de-energize the signals within both corresponding to the next successive signal station when the signal devices within said vehicles have been actuated from said next successive station.

34. The combination with a plurality of vehicles moving between a plurality of stations, of responsive devices within said vehicles and at said stations, means for actuating said devices, means at each of said stations for conditioning said actuating means for energization when a vehicle approaches said station, and means for de-energizing said actuating means when one of said vehicles is within a predetermined length of a signaling station upon the approach of another vehicle and before said last-named vehicle enters said predetermined length of said signaling station.

35. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof, and pre-resetting means for preventing the signal device within the second of said vehicles from being actuated after the signal device within the first of said vehicles has been actuated.

36. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, and pre-resetting means for preventing a signal device within the second of said vehicles from being actuated after the signal device within the first of said vehicles has been actuated and said last-named vehicle is within a predetermined length of said station.

37. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance therebehind, means rendering said preventing means inoperative when the signal device within said first vehicle responds upon approaching a signaling station more than a predetermined distance from said second vehicle if thereafter said second vehicle comes within said predetermined distance of the first, and pre-resetting means for preventing the signal device within the second of said vehicles from being actuated after the signal device within the first of said vehicles has been actuated and said last-named vehicle is within a predetermined length of said station.

38. The combination with a plurality of vehicles moving in the same direction between a plurality of stations, of signal devices within said vehicles, means for actuating said devices, means at each of said stations for conditioning said actuating means for energization when a vehicle approaches said station, means for de-energizing said actuating means when said last-named vehicle leaves said station, means for de-energizing said actuating means when one of said vehicles is within a predetermined length of a signaling station upon the approach of another vehicle and before said last-named vehicle enters said predetermined length of said signaling station, and means operable upon the continuing of said second vehicle past said first while the first is approaching or standing at the signaling station to de-energize the signals within both corresponding to the next successive signal station when the signal devices within said vehicles have been actuated from said next successive station.

39. The combination with a plurality of vehicles moving in the same direction between a plurality of stations, of signal devices within said vehicles, means for actuating said devices, means at each of said stations for conditioning said actuating means for energization when a vehicle approaches said station, means for preventing the signal device within one of said vehicles from being actuated when another of said vehicles is within a predetermined distance thereof, means rendering said preventing means inoperative when the signal device within one of said vehicles responds upon approaching a signaling station more than a predetermined distance from another of said vehicles if thereafter this last-named vehicle comes within said predetermined distance, means for de-energizing said actuating means when one of said vehicles is within a predetermined length of a signaling station upon the approach of another vehicle and before said last-named vehicle enters said predetermined length of said signaling station, and means de-energizing said actuating means when the signal-receiving one of said vehicles passes a predetermined length behind said station.

40. The combination with a plurality of vehicles moving in the same direction between a plurality of stations, signal devices at each of said stations for each of said vehicles, means for actuating said devices, means at each of said stations for conditioning said actuating means for energization when a vehicle approaches said stations, a relay connected to a control circuit associated with each vehicle, means for actuating said relay and preventing the station signal device of one vehicle from being actuated when another of said vehicles is within a predetermined distance therebehind, means rendering said last-named means inoperative when the said signal device of one of said vehicles responds upon approaching a signaling station more than a predetermined distance from another of said vehicles if thereafter this last-named vehicle comes within said last-named distance, and means for de-energizing said actuating means when said first-named vehicle is within a predetermined length of a signaling station upon the approach of another vehicle and before said last-named vehicle enters said predetermined length of said signaling station.

ROBERT NEUSCHOTZ.